Patented July 21, 1942

2,290,561

UNITED STATES PATENT OFFICE 2,290,561

PROCESS OF VULCANIZING RUBBER

Joseph R. Ingram, Nitro, W. Va., assignor to Monsanto Chemical Company, St. Louis, Mo., a corporation of Delaware No Drawing. Application August 23, 1939, Serial No. 291,543

18 Claims. (Cl. 260—800)

The present invention relates to the art of rubber manufacture and particularly relates to rubber compositions which resist deterioration due to aging or to exposure to the atmosphere. It has long been known that such deterioration may be greatly retarded by treating the rubber before or after vulcanization with certain substances known as age resistors or antioxidants. One object of this invention is to provide a superior class of antioxidants for rubber. A further object of this invention is to provide a class of materials which, when incorporated into rubber preferably before vulcanization thereof, impart thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be ascertained by subjecting samples of the vulcanized product to the action of air or oxygen under elevated pressure and at elevated temperature. The aged rubber samples are then examined and tested and the test data compared with the results obtained on testing the unaged rubber samples. The deterioration in properties as a result of the oxidation treatment is indicative of the result that would normally be expected of that particular stock during actual service. Such a test produces an effect on a vulcanized rubber stock comparable with that resulting from several years of natural aging of the rubber depending upon the conditions of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

The reaction product of aniline and acetone comprising 2,2,4 trimethyl dihydro quinoline is known to possess desirable age resisting properties. Upon treatment with a mineral acid this material undergoes a change, probably a rearrangement, with the formation of a hard brittle resinous like material. The desirable properties of the latter product as a rubber antioxidant are disclosed in my prior Patent U. S. 2,064,752. The present invention is an improvement over the product produced in accordance with the process disclosed in the aforementioned patent.

In accordance with this invention it has been discovered that if the acid treatment of 2,2,4 trimethyl dihydro quinoline is carried out at temperatures higher than those heretofore employed an improved product is formed, for example improved flex cracking resistance is imparted to the rubber.

As a specific embodiment of the invention 100 parts by weight of a product formed by reacting aniline and acetone comprising 2,2,4 trimethyl dihydro quinoline were treated with 50 parts by weight of concentrated hydrochloric acid and heated therewith for 18 hours at a temperature of substantially 130–140° C. A resinous solid was obtained on cooling. The product being acid in nature was preferably neutralized before being incorporated in rubber. This was conveniently accomplished by adding said product to a benzene-caustic soda solution. After neutralization was completed the alkaline layer was separated from the solvent which contains the preferred material dissolved therein. After removal of the solvent the resinous solid remaining was incorporated into a typical rubber stock and the aging and flexing properties compared with a similar stock containing as an anti-oxident the product prepared in the same manner except that the heating with concentrated hydrochloric acid was carried out at temperatures of 85 to 90° C., as described in U. S. 2,064,752. Rubber stocks were compounded comprising

|  | Stock | |
|---|---|---|
|  | A | B |
|  | Parts by weight | Parts by weight |
| Smoked sheets of rubber | 100 | 100 |
| Carbon black | 30 | 30 |
| Zinc oxide | 5 | 5 |
| Sulfur | 3 | 3 |
| Pine tar | 2 | 2 |
| Stearic acid | 3 | 3 |
| Benzothiazyl thio benzoate | 0.8 | 0.8 |
| Diphenyl guanidine | 0.2 | 0.2 |
| 2,2,4 trimethyl dihydro quinoline treated with hydrochloric acid at 130–140° C | 1.0 |  |
| 2,2,4 trimethyl dihydro quinoline treated with hydrochloric acid at 85–90° C |  | 1.0 |

The stocks so compounded were vulcanized by heating for different periods of time at the temperature of thirty pounds of steam pressure per square inch and the cured rubber products tested on a flexing machine as described above, both before aging and after aging in a Geer oven for 7 days at 70° C. It was found that the stock containing the product produced by treating with hydrochloric acid at the higher temperature (stock A) flexed approximately 20,000 times more both before and after aging than the stock containing the prior known product (stock B). This is obviously an important improvement especially in view of the fact that exceptional age resisting properties accompany the improvement in flex cracking resistance. Thus the modulus and tensile properties of the above stocks unaged and after aging in a bomb for different periods of time under 300 lbs. oxygen pressure per square inch are given below:

*Table I*

| Stock | Cure time in mins. | Hrs. aged | Modulus of elasticity in lbs./in.² at elongations of— | | Tensile at break in lbs./in.² | Ult. elong., percent |
|---|---|---|---|---|---|---|
| | | | 200% | 400% | | |
| A | 60 | 0 | 1,160 | 3,120 | 4,550 | 550 |
| B | 60 | 0 | 1,140 | 3,280 | 4,600 | 545 |
| A | 60 | 96 | 1,200 | 2,960 | 3,450 | 510 |
| B | 60 | 96 | 1,240 | 2,970 | 3,360 | 480 |
| A | 75 | 0 | 1,300 | 3,425 | 4,550 | 520 |
| B | 75 | 0 | 1,260 | 3,460 | 4,500 | 525 |
| A | 75 | 96 | 1,370 | 3,000 | 3,200 | 450 |
| B | 75 | 96 | 1,350 | 3,080 | 3,080 | 400 |

The above data show the highly desirable aging properties imparted to a rubber stock by the incorporation of a small proportion of the preferred antioxidant.

Other quantities of hydrochloric acid may be employed in the preparation of the preferred antioxidant than that hereinbefore set forth. Thus, 100 parts by weight of 2,2,4 trimethyl dihydro quinoline have been treated with 30 and 40 parts by weight of concentrated hydrochloric acid in a manner analogous to that described above wherein 50 parts by weight of acid were employed and the product so obtained incorporated in a typical rubber stock and the flexing properties improved to substantially the same degree described above. Further, other temperatures may be employed. Thus temperatures ranging from 130 to 260° C. have been employed in preparing the preferred antioxidant. In addition other strong inorganic acids than hydrochloric as for example sulfuric acid, may be employed. Likewise the periods of heating may be varied.

It is preferred to employ a temperature of from 130° C. to 170° C. in carrying out the reaction but desirable results have been obtained at higher temperatures. For example as a further embodiment of the invention 2,2,4 trimethyl dihydro quinoline was treated with hydrochloric acid in the usual manner at a temperature of 85 to 90° C. and then subsequently heated for three hours at 250° C. A resinous product melting at 123 to 135° C. was obtained. The final product was incorporated into a typical rubber stock employed for the manufacture of tire tread and found to lend additional flex resisting properties over a similar stock containing 2,2,4 trimethyl dihydro quinoline treated with hydrochloric acid at 85–90° C. in the usual manner.

It is obvious that practice of the present invention is not limited to the specific compositions given above, such compositions being merely illustrative of the manner of employing the antioxidants or age-resistors of the invention. The antioxidants or age-resistors may be employed in different proportions than herein described and in conjunction with other vulcanizing agents than those specifically disclosed, for this invention is applicable generally to pure rubber or rubber compositions of the most varied sort. Furthermore, the preferred class of materials may be employed in conjunction with other accelerators than those specifically shown with varying degrees in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, India rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with a product obtained by admixing 2,2,4 trimethyl dihydro quinoline with a strong non-oxidizing mineral acid and heating at a temperature above 130° C.

2. The method of preserving a rubber which comprises treating a rubber with a product obtained by admixing 2,2,4 trimethyl dihydro quinoline with hydrochloric acid and heating at a temperature of 130 to 260° C.

3. The method of preserving a rubber which comprises treating a rubber with a product obtained by admixing 2,2,4 trimethyl dihydro quinoline with hydrochloric acid and heating at a temperature of 130 to 170° C.

4. The method of preserving a rubber which comprises treating a rubber with a product obtained by admixing 2,2,4 trimethyl dihydro quinoline with concentrated hydrochloric acid and heating at a temperature of 130–170° C.

5. The method of preserving a rubber which comprises treating a rubber with a product obtained by admixing substantially 100 parts by weight of 2,2,4 trimethyl dihydro quinoline with substantially 30 to 50 parts by weight of concentrated hydrochloric acid and heating at a temperature of 130–170° C.

6. The method of preserving a rubber which comprises treating a rubber with a product obtained by admixing substantially 100 parts by weight of 2,2,4 trimethyl dihydro quinoline with substantially 50 parts by weight of concentrated hydrochloric acid and heating at a temperature of 130–140° C.

7. A composition comprising a rubber and a product obtained by admixing 2,2,4 trimethyl dihydro quinoline with a strong non-oxidizing mineral acid and heating at a temperature above 130° C.

8. A composition comprising a rubber and a product obtained by admixing 2,2,4 trimethyl dihydro quinoline with hydrochloric acid and heating at a temperature of 130 to 260° C.

9. A composition comprising a rubber and a product obtained by admixing 2,2,4 trimethyl dihydro quinoline with hydrochloric acid and heating at a temperature of 130 to 170° C.

10. A composition comprising a rubber and a product obtained by admixing 2,2,4 trimethyl dihydro quinoline with concentrated hydrochloric acid and heating at a temperature of 130–170° C. and neutralizing the resultant product.

11. A composition comprising a rubber and a product obtained by admixing substantially 100 parts by weight of 2,2,4 trimethyl dihydro quinoline with substantially 30 to 50 parts by weight of concentrated hydrochloric acid and heating at a temperature of 130–170° C.

12. A composition comprising a rubber and a product obtained by admixing substantially 100 parts by weight of 2,2,4 trimethyl dihydro quinoline with substantially 50 parts by weight of concentrated hydrochloric acid and heating at a temperature of 130–140° C.

13. A vulcanized rubber comprising the vulcanization product of a rubber stock having admixed therewith prior to the vulcanization thereof a product obtained by admixing 2,2,4 trimethyl dihydro quinoline with hydrochloric acid and mineral acid and heating at a temperature above 130° C.

14. A vulcanized rubber comprising the vulcanization product of a rubber stock having admixed therewith prior to the vulcanization thereof a product obtained by admixing 2,2,4 trimethyl dihydro quinoline with hydrolchloric acid and heating at a temperature of 130 to 260° C.

15. A vulcanized rubber comprising the vulcanization product of a rubber stock having admixed therewith prior to the vulcanization thereof a product obtained by admixing 2,2,4 trimethyl dihydro quinoline with hydrochloric acid and heating at a temperature of 130 to 170° C.

16. A vulcanized rubber comprising the vulcanization product of a rubber stock having admixed therewith prior to the vulcanization thereof a product obtained by admixing 2,2,4 trimethyl dihydro quinoline with concentrated hydrochloric acid and heating at a temperature of 130–170° C. and neutralizing the resultant product.

17. A vulcanized rubber comprising the vulcanization product of a rubber stock having admixed therewith prior to the vulcanization thereof a product obtained by admixing substantially 100 parts by weight of 2,2,4 trimethyl dihydro quinoline with substantially 30 to 50 parts by weight of concentrated hydrochloric acid and heating at a temperature of 130–170° C.

18. A vulcanized rubber comprising the vulcanization product of a rubber stock having admixed therewith prior to the vulcanization thereof a product obtained by admixing substantially 100 parts by weight of 2,2,4 trimethyl dihydro quinoline with substantially 50 parts by weight of concentrated hydrochloric acid and heating at a temperature of 130–140° C.

JOSEPH R. INGRAM.

CERTIFICATE OF CORRECTION.

Patent No. 2,290,561. July 21, 1942.

JOSEPH R. INGRAM.

It is hereby certified that error appears in the printed specification of the above numbered patent requiring correction as follows: Page 3, first column, line 22, claim 13, for the words "hydrochloric acid and" read --a strong non-oxidizing--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.